United States Patent [19]

Kameyama

[11] 4,242,799
[45] Jan. 6, 1981

[54] CAR SHAVER AND HOLDER THEREFOR

[75] Inventor: Atsumi Kameyama, Ikoma, Japan

[73] Assignee: Sharp Kabushiki Kaisha, Osaka, Japan

[21] Appl. No.: 931,528

[22] Filed: Aug. 7, 1978

[30] Foreign Application Priority Data

| Aug. 17, 1977 | [JP] | Japan | 52-110409[U] |
| Aug. 17, 1977 | [JP] | Japan | 52-110410[U] |
| Aug. 25, 1977 | [JP] | Japan | 52-114189[U] |
| Aug. 30, 1977 | [JP] | Japan | 52-118043[U] |
| Sep. 5, 1977 | [JP] | Japan | 52-120314[U] |
| Mar. 14, 1978 | [JP] | Japan | 53-32876[U] |
| Mar. 14, 1978 | [JP] | Japan | 53-32877[U] |

[51] Int. Cl.$^3$ ............................................. B26B 19/38
[52] U.S. Cl. ....................................... 30/43.1; 30/90
[58] Field of Search ............... 30/34 R, 43.1, 43.6, 30/90, DIG. 1; 248/37.3, 37.6, 316 B; 206/351; 200/159 A, 61.58 R, 61.71

[56] References Cited

U.S. PATENT DOCUMENTS

| 2,157,257 | 5/1939 | Crum | 30/34 R |
| 2,316,995 | 4/1943 | Smith | 248/316 B |
| 2,474,899 | 7/1949 | Hutt | 30/34 R X |
| 3,043,996 | 7/1962 | Hartwig | 30/90 X |
| 3,240,892 | 3/1966 | Popoff | 200/61.58 R |
| 3,538,604 | 11/1970 | Walter | 30/34 R |
| 3,633,089 | 1/1972 | Dorion | 30/34 R |
| 3,793,724 | 2/1974 | Messinger | 30/90 X |

FOREIGN PATENT DOCUMENTS 2059223  6/1972  Fed. Rep. of Germany ........... 206/351

Primary Examiner—Gary L. Smith
Attorney, Agent, or Firm—Birch, Stewart, Kolasch & Birch

[57] ABSTRACT

An electric shaver is constructed to operate by electric energy generated from a car battery. A holder is fixed to a dashboard of a car for accommodating the electric shaver when it is not in use. A plug of the electric shaver is inserted into a cigarette lighter socket secured on the dashboard to receive the electric energy generated from the car battery. The electric shaver includes a slidable hood for selectively protecting a cutting portion of the electric shaver and exposing the cutting portion to ambience. A switching means is associated with the slidable hood so that the electric shaver is automatically power supplied from the plug when the slidable hood is located at a position where the cutting portion is exposed to the ambience.

5 Claims, 16 Drawing Figures

000
CAR SHAVER AND HOLDER THEREFOR

BACKGROUND AND SUMMARY OF THE INVENTION

The present invention relates to an electric shaver for use in a car.

To facilitate handling of an electric shaver in a car while the operator drives the car, it is required that the electric shaver be handled by only one hand. In addition, a housing is required for accommodating the electric shaver when it is not in use.

Accordingly, an object of the present invention is to provide an electric shaver which receives its power supply from a car battery.

Another object of the present invention is to provide a novel switch mechanism for controlling power supply to a motor included within an electric shaver.

Still another object of the present invention is to provide a holder for accommodating an electric shaver in a car when the electric shaver is not being used.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electric shaver is electrically communicated with a plug through a flexible cord. The plug is constructed so that is can be electrically coupled with a cigarette lighter socket secured on a dashboard of a car in order to supply the necessary power to a motor included within the electric shaver. The electric shaver comprises a slidable hood which functions to protect the cutting portion of the electric shaver when it is held at a first predetermined position, and to expose the cutting portion to the ambience when it is held at a second predetermined position. A switch mechanism is associated with the slidable hood in such a manner that the motor is supplied with power when the slidable hood is held at the second predetermined position.

A holder is fixed to the dashboard of the car for accommodating the electric shaver when it is not in use. The holder is provided with a first portion for securing the electric shaver and a second portion for securing the plug electrically communicated with the electric shaver. In operation, a cigarette lighter is drawn out from the cigarette lighter socket, and the plug is inserted into the cigarette lighter socket. The cigarette lighter is secured in the second portion of the holder when the electric shaver is used.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2 and 3 are partial sectional views of the electric shaver of FIG. 1, wherein FIG. 2 shows a condition where a hood is held at a first position, and FIG. 3 shows another condition where the hood is held at a second position;

FIGS. 6 and 7 are plan views of an embodiment of a lock mechanism of the hood employed in the electric shaver of FIG. 1, wherein FIG. 6 shows a condition where the hood is locked, and FIG. 7 shows another condition where the lock mechanism is released;

FIGS. 10 and 11 are perspective views of the holder of FIG. 1, wherein FIG. 10 shows a condition where the electric shaver is secured in the holder, and FIG. 11 shows another condition where the electric shaver is released from the holder;

DESCRIPTION OF THE PREFERRED EMBODIMENTS

Figure 1:
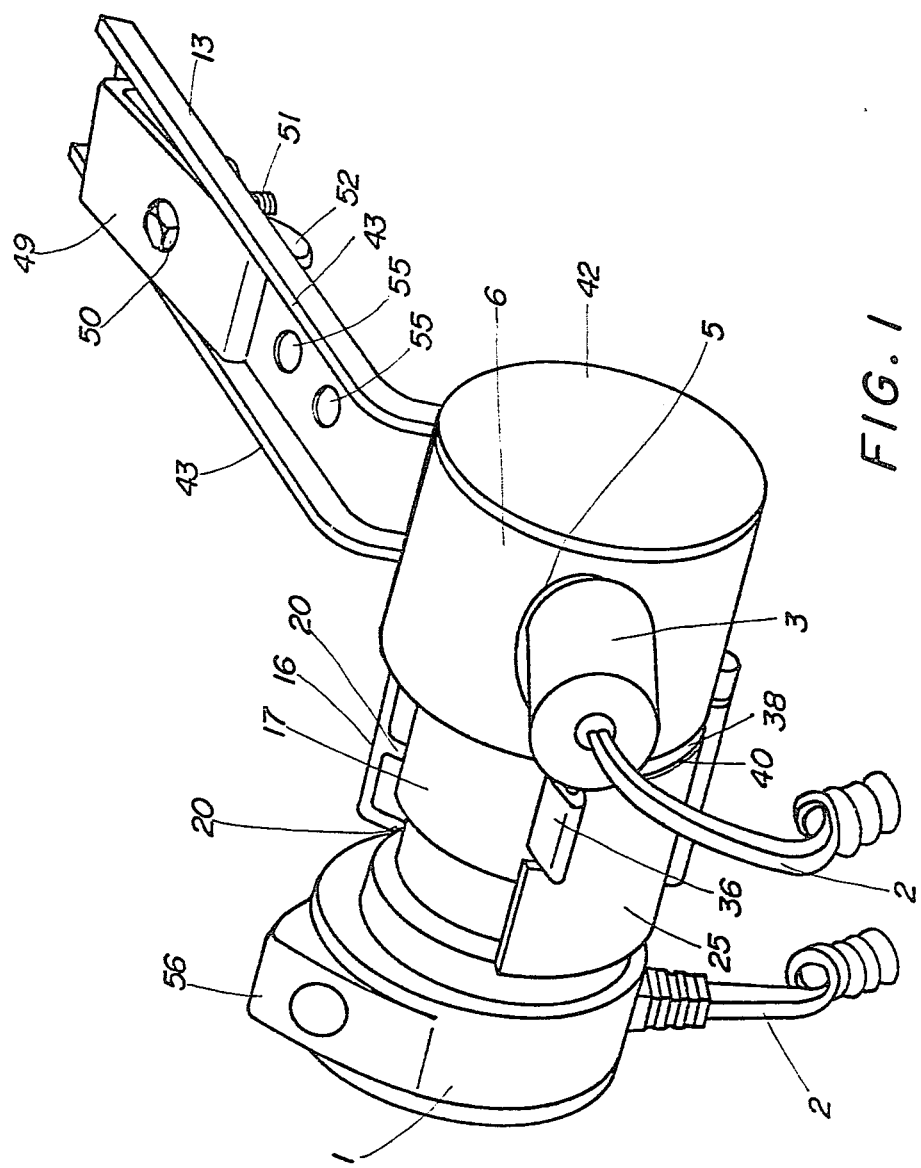
FIG. 1 is a perspective view of an embodiment of an electric shaver of the present invention accommodated in an embodiment of a holder of the present invention.

Referring in greater detail to the drawings in which like numerals indicate like parts throughout the several views, FIG. 1 illustrates an electric shaver 1 secured in a holder 6 which is attached to a dashboard (not shown) of a car through the use of a fixing angle 13. The electric shaver 1 is electrically communicated with a plug 3 through a flexible cord 2. The plug 3 is secured in a hole 5 when the electric shaver 1 is not used. The plug 3 is inserted into a cigarette lighter socket (not shown) formed on the dashboard of the car, when the electric shaver 1 is in use, so as to provide power for the electric shaver 1. At this moment, the cigarette lighter can be secured or stored in the hole 5.

FIGS. 2, 3, 4 and 5 show the electric shaver 1.

Figure 2:
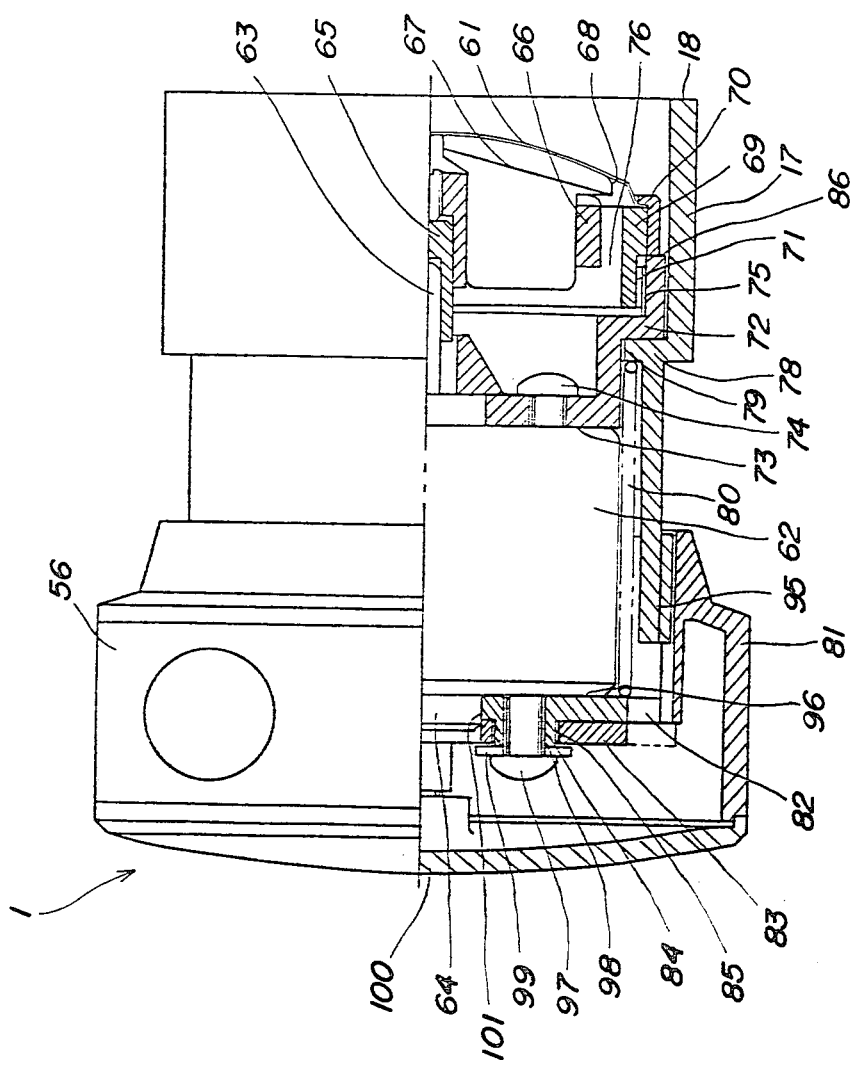
Figure 3:
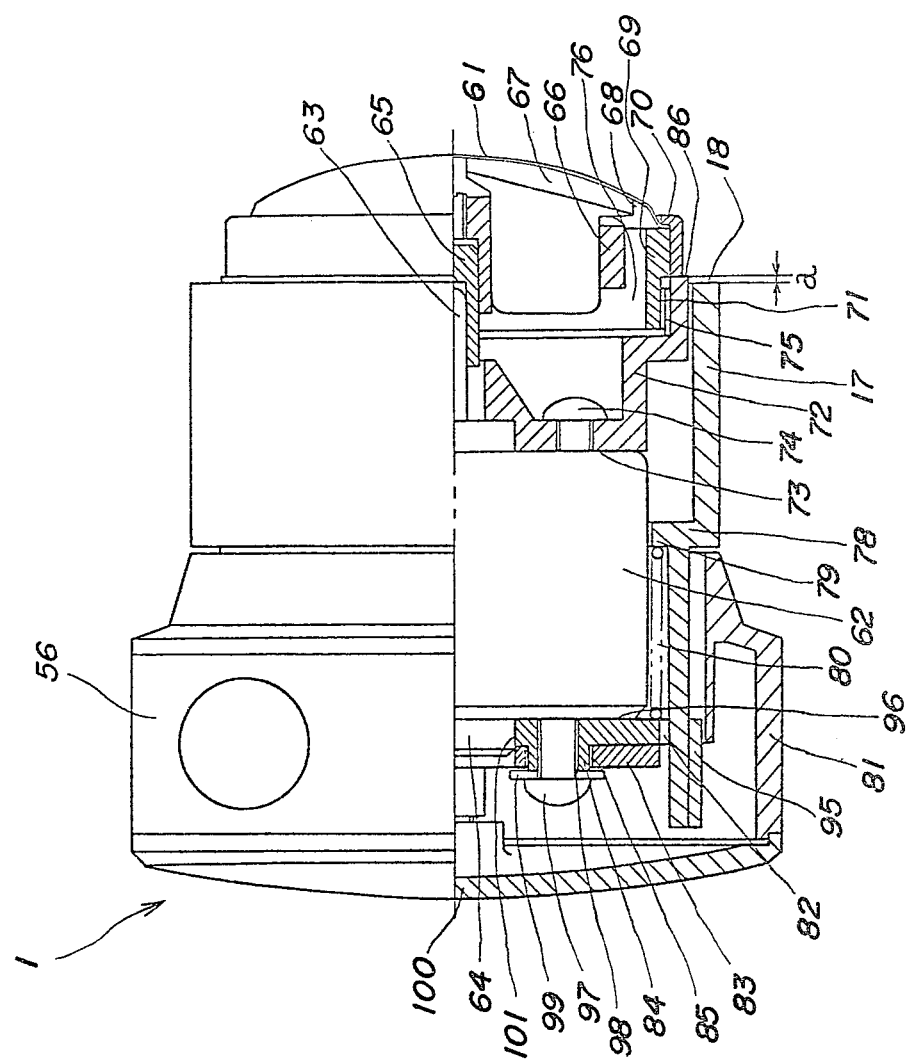
Figure 4:
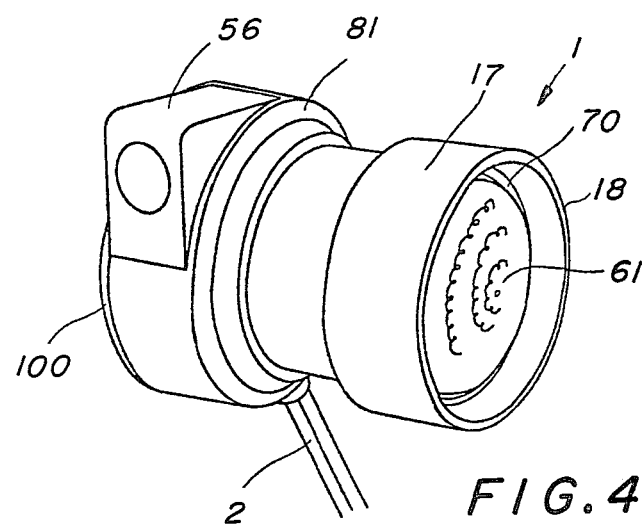
FIGS. 4 and 5 are perspective views of the electric shaver of FIGS. 2 and 3, respectively.
Figure 5:
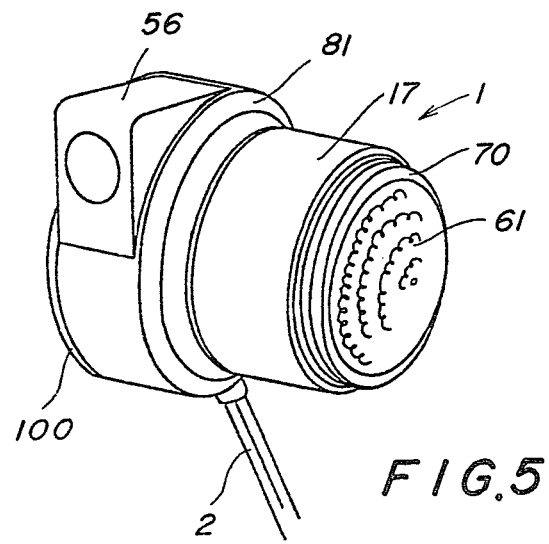

The electric shaver 1 mainly comprises a slidable hood 17, which functions to protect a shear plate 61 when the electric shaver 1 is not in use as shown in FIGS. 2 and 4, and functions to expose the shear plate 61 to the ambience when the electric shaver 1 is in use as shown in FIGS. 3 and 5.

The electric shaver 1 comprises a motor 62 including a motor shaft 63 and a shaft holder 64. A joint 65 is fixed to the motor shaft 63, and then a rotary blade table 66 supporting a plurality of cutting members 67 is removably secured to the joint 65. The cutting member 67 and the shear plate 61 function, in combination, to form a cutting portion 68. The shear plate 61 is fixed to a shear plate frame 69 via an annular fixing member 70. The shear plate frame 69 includes a screwed portion 71. A shear plate supporter 72 is fixed to one surface 73 of a housing of the motor 2 through the use of screws 74. The shear plate supporter 72 includes a screwed portion 75, which cooperates with the screwed portion 71 to removably attach the shear plate frame 69 to the shear plate supporter 72. A chamber 76 functions to retain the shaved mustache.

Figure 8:
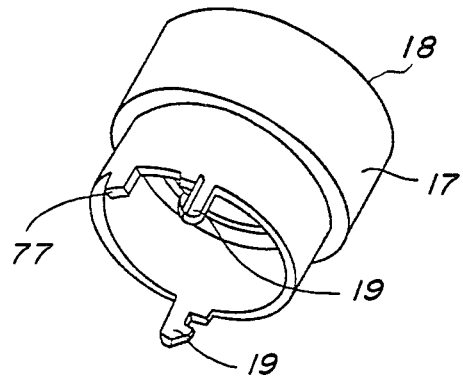
FIG. 8 is a perspective view of the hood employed in the electric shaver of FIG. 1.

The slidable hood 17 includes an open end 18, hooked portions 19 and a protrusion 77 as shown in FIG. 8. The slidable hood 17 further includes a stair portion 78 to which a protrusion 79 is fixed (see FIGS. 2 and 3). The slidable hood 17 is slidably secured around the motor 62 and the shear plate supporter 72 so that the shear plate 61 is protected by the slidable hood 17 when the slidable hood 17 is held at a first position as shown in FIG. 2, and the shear plate 61 is exposed to the ambience when the slidable hood 17 is held at a second position as shown in FIG. 3. Spring means 80 are disposed between the protrusion 79 and a body 81 of the electric shaver 1 to depress the slidable hood 17 rightward in the drawings of FIGS. 2 and 3.

Figure 6:
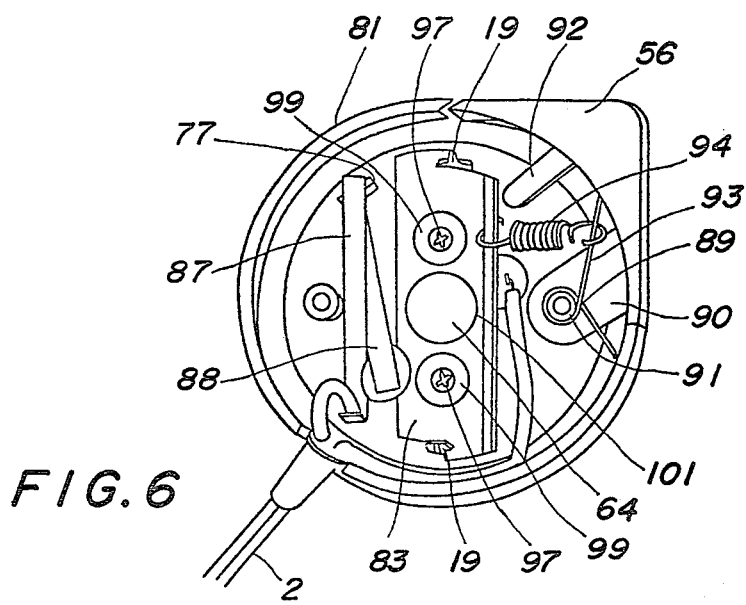
Figure 9:
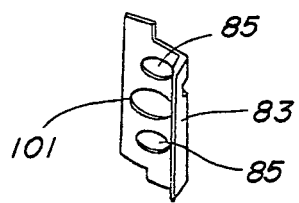
FIG. 9 is a perspective view of a lock leaf employed in the lock mechanism of FIGS. 6 and 7.

The body 81 is provided with openings 82 (FIGS. 2, 3 and 7) for passing the hooked portions 19 and the protrusion 77. A locking member 83 as shown in FIG. 9 is secured to the body 81 through the use of bosses 84 (FIGS. 2 and 3) formed on the body 81 and elliptic openings 85 formed in the locking member 83. Therefore, the locking member 83 is slightly rotatable around the bosses 84. When the slidable hood 17 is depressed leftward as shown in FIG. 3, the hooked portions 19 are locked by the locking member 83 to hold the slidable hood 17 as shown in FIG. 6. At this moment, an open end 86 of the shear plate supporter 72 is slightly extruded from the open end 18 of the slidable hood 17 by a distance a as shown in FIG. 3.

When the slidable hood 17 is locked at the position shown in FIGS. 3 and 5, the protrusion 77 functions to close a normal open switch mechanism comprising switch leaves 87 and 88, which are supported by the body 81, as shown in FIG. 6, whereby the motor 62 is supplied with power.

Figure 7:
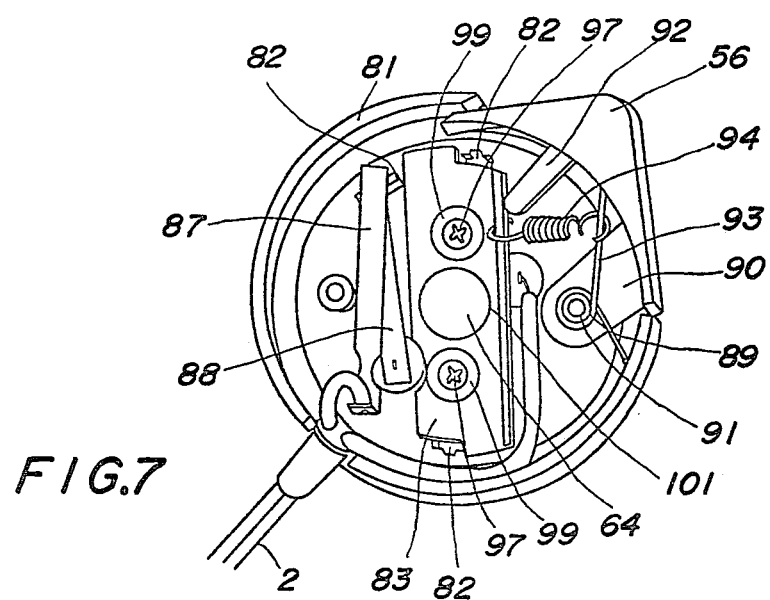

A lock release button 56 is rotatably secured to the body 81 through the use of an opening 89 formed in a leaf 90, which is fixed to the lock release button 56, and a protrusion 91 secured to the body 81 as shown in FIGS. 6 and 7. A release lever 92 is fixed to the lock release button 56 so that the release lever 92 depresses the locking member 83 to release the hooked portions 19 when the lock release button 56 is depressed as shown in FIG. 7. A spring 93 is secured around the protrusion 91, and another spring 94 is disposed between the spring 93 and the locking member 83 in order to place the locking member 83 at a normal position where the hooked portions 19 are locked by the locking member 83 as shown in FIG. 6.

One end 95 of the slidable hood 17 is slidable through the body 81. The body 81 is fixed to the other surface 96 of the housing of the motor 62 through the use of screws 97 which are secured through openings 98 formed in the bosses 84 via washers 99. A cover 100 is secured on one end of the body 81. The locking member 83 includes an opening 101 formed therein, the opening 101 accommodating the shaft holder 64, whereby the locking member 83 is slightly rotatable around the shaft holder 64.

When the lock release button 56 is depressed (FIG. 7) and the slidable hood 17 is returned to the position shown in FIGS. 2 and 4, the protrusion 77 fixed to the slidable hood 17 is separated from the switch leaf 88 so that the normal open switch mechanism is placed in the normal open condition. Accordingly, power supply to the motor 62 is terminated when the lock release button 56 is depressed.

FIGS. 10, 11, 12, 13 and 14 show, in detail, the holder 6 and the fixing angle 13.

Figure 10:
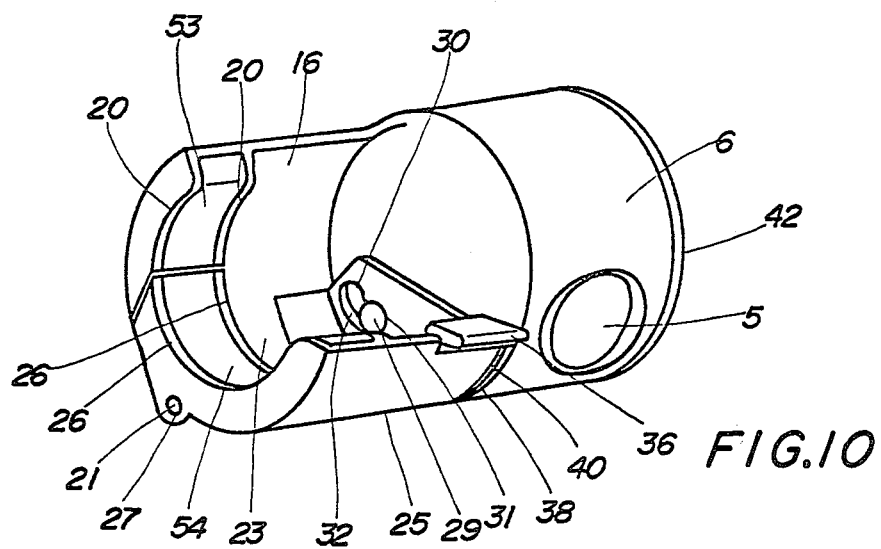
Figure 12:
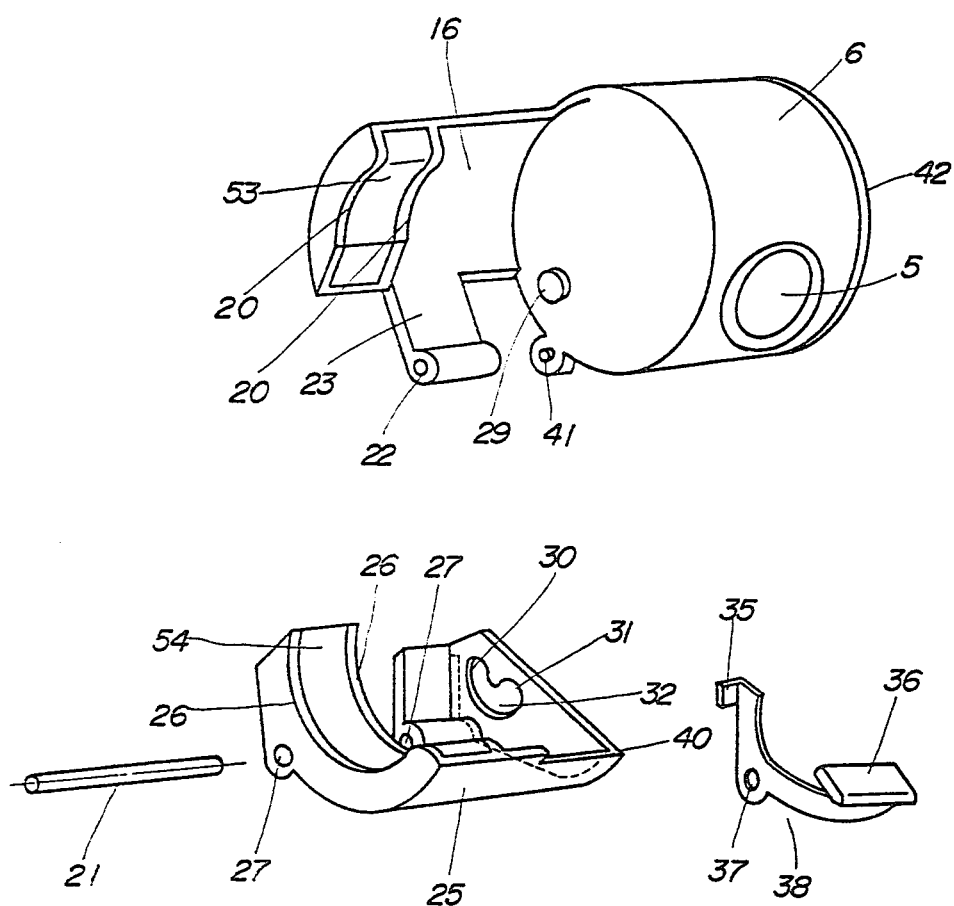
FIG. 12 is an exploded perspective view of the holder of FIGS. 10 and 11.
Figure 13:
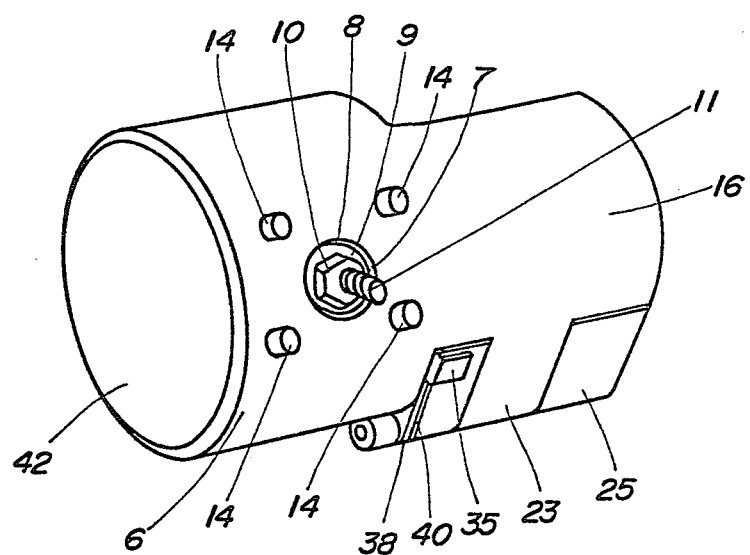
FIG. 13 is a perspective rear view of the holder of FIGS. 10 and 11.
Figure 14:
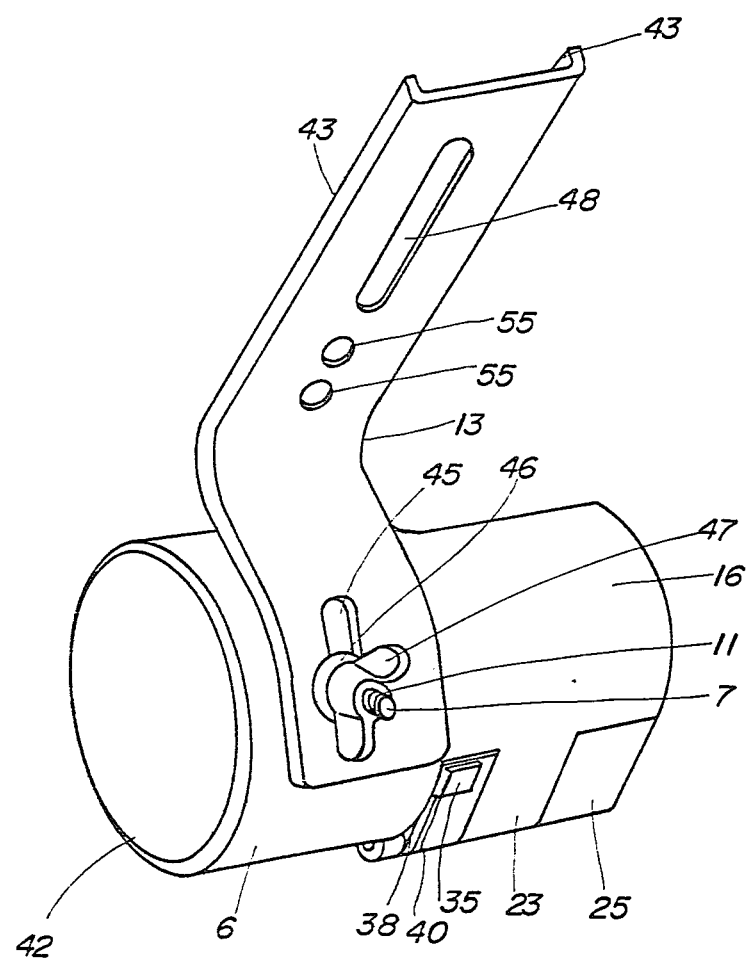
FIG. 14 is a perspective view of an embodiment of a fixing angle for attaching the holder to a dashboard of a car.

A throughhole 8 is formed in the holder 6 as shown in FIG. 13 to communicate the hole 5 to the back of the holder 6. A screw 7 is disposed through the throughhole 8 and fixed through the use of a washer 9 and a nut 10 in such a manner than an end 11 of the screw 7 is extruded by a predetermined length. The fixing angle 13 is associated with the extruded end 11 of the screw 7 as shown in FIG. 14. Protrusions 14 are formed on the rear surface of the holder 6 to strictly determine the inclination of the fixing angle 13 when the fixing angle 13 is secured to the screw 7 through the use of a washer 46 and a nut 47. The holder 6 comprises a stationary member 16 and a movable member 25. The stationary member 16 includes raised portions 20, a buffer member 53 supported by the raised portions 20, and a resilient leaf 23. The resilient leaf 23 is provided with a throughhole 22 for securing a pole 21 as shown in FIG. 12. The movable member 25 includes raised portions 26 and a buffer member 54 supported by the raised portions 26. The raised portions 20 and 26 and the buffer members 53 and 54 function, in combination, to tightly accommodate the electric shaver 1 when the electric shaver 1 is secured to the holder 6 and the holder 6 is placed in the closed condition as shown in FIG. 10.

Figure 11:
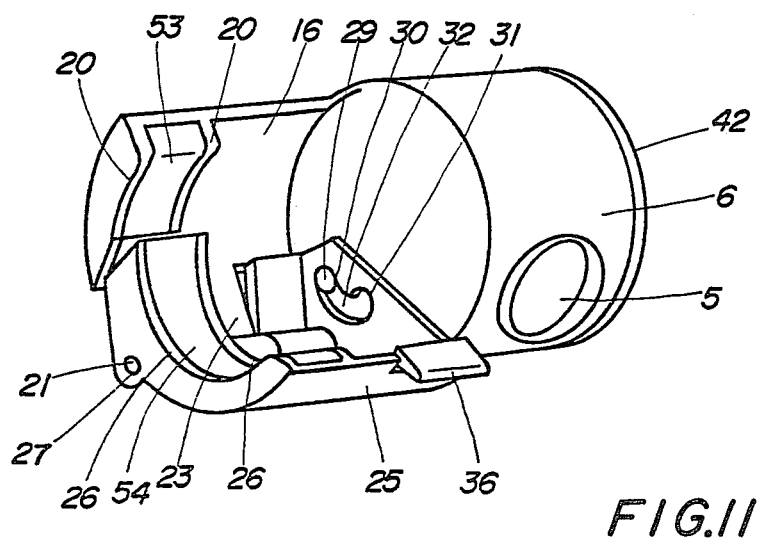

The movable member 25 is provided with a throughhole 27 for securing the pole 21 therethrough, whereby the movable member 25 is rotatable around the pole 21. A heart shaped opening 32 is formed in one side wall of the movable member 25. The heart shaped opening 32 cooperates with a protrusion 29 formed on a side wall of a body 42 of the holder 6 in such a manner that the rotation of the movable member 25 is limited by both ends 30 and 31 of the heart shaped opening 32. In the opened position, one end 30 of the heart shaped opening 32 accommodates the protrusion 29 as shown in FIG. 11, whereby the movable member 25 is retained in the second position. In the closed position, the other end 31 of the heart shaped opening 32 accommodates the protrusion 29 as shown in FIG. 10, whereby the movable member 25 is retained in the first position.

An indent 40 is formed on the outer surface of the side wall of the movable member 25 in such a manner that the indent 40 follows the periphery of the movable member 25. A lever 38 is accommodated in the indent 40. The lever 38 includes a hooked portion 35 and a lever top 36, which hold both ends of the movable member 25. The lever 38 further includes a throughhole 37 for securing the pole 21 therethrough. The throughhole 37 is secured to a protrusion 41 formed on the side wall of the body 42 of the holder 6, whereby the movable member 25 and the lever 38 are rotatably secured around the protrusion 41. When the lever top 36 is depressed, the movable member 25 is rotated and held at the open state as shown in FIG. 11, thereby facilitating withdrawal of the electric shaver 1 from the holder 6.

The fixing angle 13 of FIG. 14 includes raised edges 43, which cooperate with the protrusions 14 formed on the holder 6 to strictly determine the angle of the holder 6 with respect to the fixing angle 13. The fixing angle 13 further includes an opening 45 through which the end 11 of the screw 7 is disposed. The holder 6 is fixed to the fixing angle 13 by the washer 46 and the nut 47. A fixing member 49 (see FIG. 1) including an opening 50 is secured to an opening 48 formed in the fixing angle 13 through the use of a screw 51 and a nut 52. One end of a dashboard (not shown) of the car is disposed between the fixing angle 13 and the fixing member 49, and then the nut 52 is fastened to attach the fixing angle 13 to the dashboard. Additional openings 55 are formed in the fixing angle 13, thereby allowing the selection of the location of the fixing member 49 with respect to the fixing angle 13.

Figure 15:
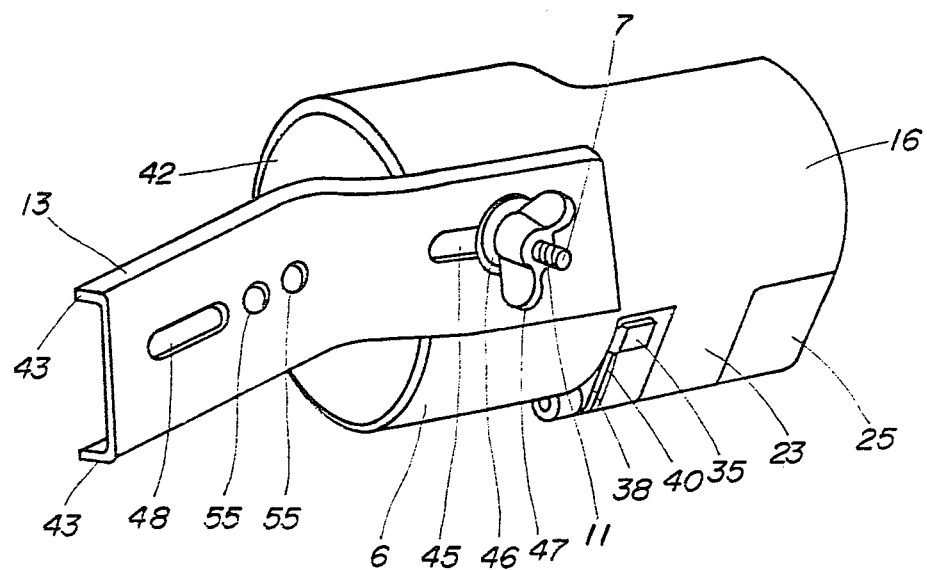
FIG. 15 is a perspective view of another embodiment of the fixing angle for attaching the holder to a dashboard of a car.

FIG. 15 shows another embodiment of the fixing angle, wherein the fixing angle 13 is fixed to the holder 6 so that the fixing angle 13 parallels the axis of the holder 6. Like elements corresponding to those of FIGS. 1 and 14 are indicated by like numerals.

Figure 16:
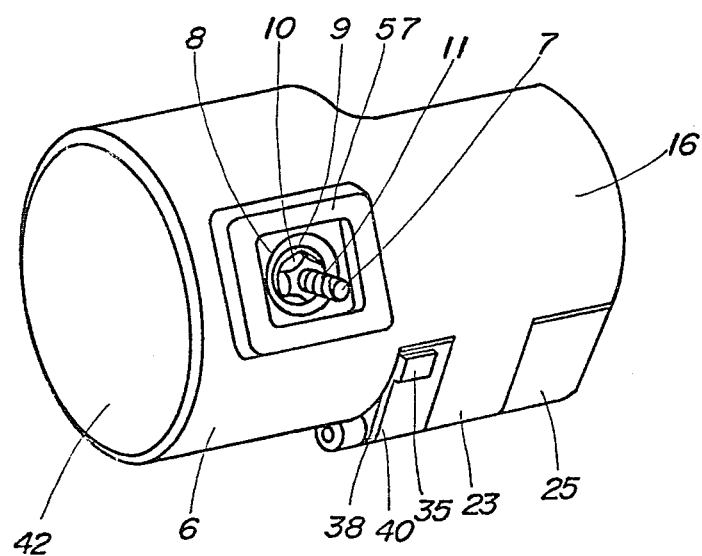
FIG. 16 is a perspective rear view of another embodiment of a holder of the present invention.

FIG. 16 shows another embodiment of the holder 6. Like elements corresponding to those of FIG. 13 are indicated by like numerals. In this embodiment, a protruded rectangular guide member 57 is formed on the holder 6 instead of the protrusions 14.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electric shaver comprising a cutting portion formed on one end of a body of said electric shaver, a motor disposed in said body of said shaver, a hood slidably secured around the body of said shaver for alternately protecting and exposing the cutting portion of said shaver, a spring means which depresses said slidable hood into a first position of protecting the cutting portion from ambience, a lock mechanism for locking said slidable hood in a second position, thereby exposing the cutting portion to ambience, a switching means comprising a normal open switch which controls the power supply to said motor, said switch comprising a pair of conductive leaves which are separated from each other when said hood is in said first position and are in contact when said hood is in said second position, and an actuator which forms a protrusion on one end of said slidable hood and engages and depresses one of said pair of conductive leaves toward the other of said pair of conductive leaves so as to automatically supply power to said motor when said hood is placed and held in said second position.

2. The electric shaver of claim 1, wherein said slidable hood includes a hooked portion formed on said one end of said slidable hood, and wherein said hooked portion is secured by said lock mechanism when said slidable hood is located at said second position.

3. The electric shaver of claim 1, which further comprises a lock release button for releasing said slidable hood from said lock mechanism at a desired time.

4. An electric shaver comprising a cutting portion formed on one end of a body of said electric shaver, a motor disposed in said body of said shaver, a hood slidably secured around the body of said shaver for alternately protecting and exposing the cutting portion of said shaver, a spring means which depresses said slidable hood into a first position of protecting the cutting portion from ambience, a lock mechanism for locking said slidable hood in a second position, thereby exposing the cutting portion to ambience, a switching means comprising a normal open switch which controls the power supply to said motor, said switch comprising a pair of conductive leaves which are separated from each other when said hood is in said first position and are in contact when said hood is in said second position, an actuator which forms a protrusion on one end of said slidable hood and engages and depresses one of said pair of conductive leaves toward the other of said pair of conductive leaves so as to automatically supply power to said motor when said hood is placed and held in said second position and a holder for accommodating the electric shaver comprising in combination a housing for accommodating said shaver, said housing comprising a stationary member and a movable member rotatably secured to said stationary member, a means provided within said movable member which when set in a first position tightly secures said electric shaver within said housing and when set in a second position readily facilitates the withdrawal of said electric shaver from said housing, a lever for rotating said movable member from said first position to said second position, a means for fixing said holder to a desired member such as the dashboard of a car, and a holding means in the form of a hole formed in said holder having a similar configuration to that of an automobile cigarette-lighter socket for accommodating a plug when said shaver is not in use which plug electrically communicates, via a flexible end, the necessary energy to said shaver when the latter is in operation.

5. The holder of claim 4, wherein said holder further comprises an angle setting means for determining the angle of said fixing means with respect to said holder.

* * * * *